(12) United States Patent
Leonard et al.

(10) Patent No.: US 9,465,754 B2
(45) Date of Patent: Oct. 11, 2016

(54) BRIDGE CIRCUIT TO ARBITRATE BUS COMMANDS

(71) Applicant: Analog Devices, Inc., Norwood, MA (US)

(72) Inventors: Alexander Leonard, Greensboro, NC (US); Shipra Bhal, Norwood, MA (US); Christopher Mayer, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 522 days.

(21) Appl. No.: 13/930,088

(22) Filed: Jun. 28, 2013

(65) Prior Publication Data
US 2015/0006775 A1    Jan. 1, 2015

(51) Int. Cl.
*G06F 13/16* (2006.01)

(52) U.S. Cl.
CPC ....... *G06F 13/1642* (2013.01); *G06F 13/1673* (2013.01)

(58) Field of Classification Search
CPC .......................... G06F 13/1642; G06F 13/1684
USPC .......................................................... 710/112
See application file for complete search history.

(56) References Cited

U.S. PATENT DOCUMENTS

| | | | | |
|---|---|---|---|---|
| 5,790,851 A * | 8/1998 | Frank | ........................ | G06F 9/52 718/100 |
| 6,968,409 B1 * | 11/2005 | Solomon | ............... | G06F 13/385 710/112 |
| 7,013,356 B2 * | 3/2006 | Moss | ................... | G06F 13/4031 710/108 |
| 7,069,365 B2 * | 6/2006 | Zatorski | .............. | G06F 13/4027 710/200 |
| 7,080,217 B2 * | 7/2006 | Kareenhalli | .......... | G06F 1/3203 711/152 |
| 7,757,049 B2 * | 7/2010 | Hastings | ............. | G06F 13/4239 710/53 |
| 7,917,706 B1 * | 3/2011 | May | .................... | G06F 13/1642 710/113 |
| 8,019,951 B2 * | 9/2011 | Suzuki | ................ | G06F 13/1684 711/147 |
| 8,707,002 B2 * | 4/2014 | Ueda | ..................... | G06F 1/3225 365/226 |
| 9,141,568 B2 * | 9/2015 | Biswas | ............... | G06F 13/1642 |
| 9,223,701 B2 * | 12/2015 | Piry | ..................... | G06F 12/0815 |
| 2005/0066097 A1 * | 3/2005 | Kawamoto | .......... | G06F 13/4243 710/240 |

* cited by examiner

*Primary Examiner* — Brian Misiura
(74) *Attorney, Agent, or Firm* — Patent Capital Group

(57) ABSTRACT

A circuit may include a queue, a monitor, and a controller. The queue may receive and store a plurality of commands from a plurality of buses to access a shared set of registers. The monitor may monitor the plurality of commands in the queue to determine whether a period of time needs to be reserved for selected commands from one of the plurality of buses. The controller, if the period of time needs to be reserved, based on the period of time determined by the monitor, may disable acceptance of commands from buses other than the one of the plurality of buses, may execute the selected commands for the one of the plurality of buses, and may allow more than one of the plurality of buses access to results of the selected commands.

20 Claims, 2 Drawing Sheets

200

BRIDGE CIRCUIT TO ARBITRATE BUS COMMANDS

BACKGROUND

Some modern data buses and interfaces offer flexibility to control or access large number of memory address or registers. This allows hardware designs to able to incorporate increasing number of features with the increasing memory and registers, without the need to change or redesign bus or interface configuration. This would also allow backward compatibility of designs.

Other modern data buses and interfaces may be optimized for speed with predefined data and command format. These buses and interfaces, however, may not be very compatible with other devices or components.

In applications such as telecommunication, a base band IC (BBIC) may include several thousand on-chip registers, and an embedded processor with its own memory and subsystem of registers. The application may need the processor to sending requests or commands on the one type of bus to access the registers, while the chip itself allows external access of the registers via another type of bus.

Thus, there is a need for improved bridge circuit that can efficiently arbitrate bus commands.

DETAILED DESCRIPTION

Figure 1:
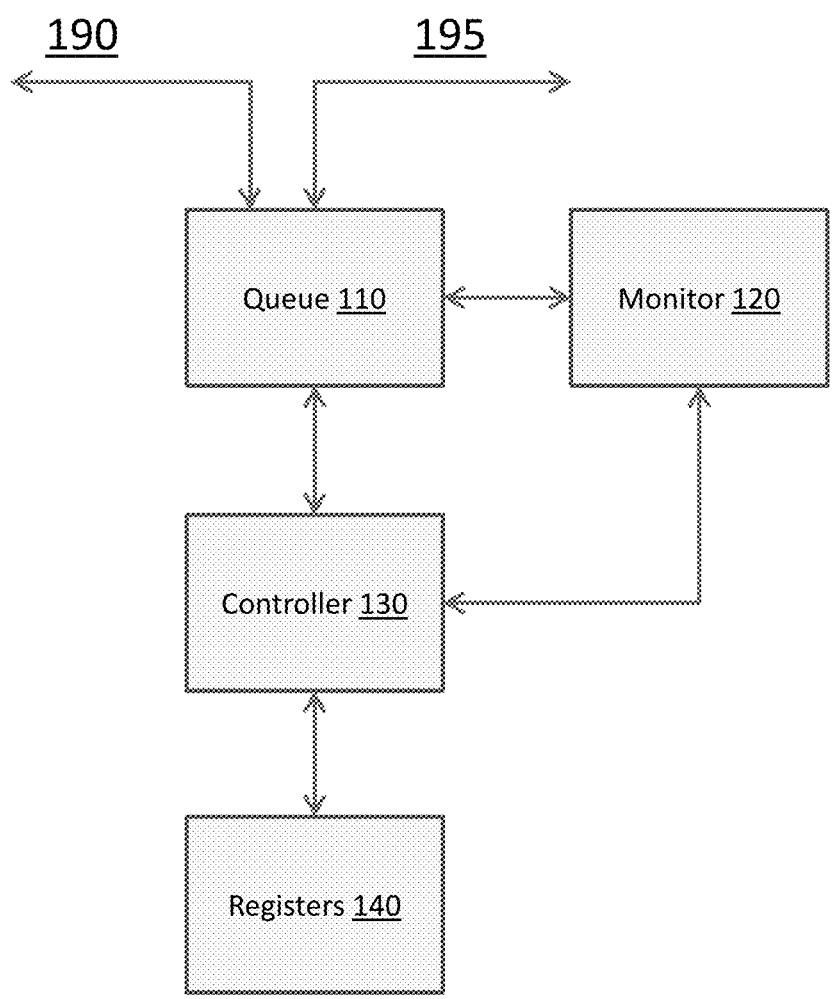
FIG. 1 illustrates a simplified block diagram of a circuit according to an embodiment of the present disclosure.

A circuit 100 may include a queue 110, a monitor 120, and a controller 130. The queue 110 may receive and store a plurality of commands from a plurality of buses 190 and 195 to access a shared set of registers 140. The monitor 120 may monitor the plurality of commands in the queue to determine whether a period of time needs to be reserved for selected commands from one of the plurality of buses 190 and 195. The controller 130, if the period of time needs to be reserved, based on the period of time determined by the monitor 120, may disable acceptance of commands from buses other than the one of the plurality of buses, may execute the selected commands for the one of the plurality of buses, and may allow more than one of the plurality of buses access to results of the selected commands.

The queue 110 may receive and store a plurality of commands from a plurality of buses 190 and 195 to access a shared set of registers 140. The queue 110 may be one or more buffers configured to receive and hold commands and data from buses 190 and 195 (and additional buses not shown here). The queue 110 may be used to transmit and receive data to processors, devices, other components via buses 190 and 195. The queue 110 may be a bridge unit configured to interface with multiple interface types with different communication protocols, such as serial interfaces (for example, Serial Peripheral Interface (SPI)), or parallel interfaces (for example, Advanced High-performance Bus (AHB)). The queue 110 may include one or more buffers configured to hold and/or reference commands and data in a specific order, for example, a first-in-first-out (FIFO) stack.

Bus 190 may include a serial interface, for example a SPI. Bus 195 may include a parallel interface, for example a AHB. A SPI 190 may be designed with a bridge to an AHB 195 whereby a processor may access shared registers 140 via the AHB 195. The SPI 190 and the AHB 195 may share an asynchronous read path (not shown) to read the shared set of registers 140.

The monitor 120 may monitor the plurality of commands in the queue to determine whether a period of time needs to be reserved for selected commands from one of the plurality of buses 190 and 195. The period of time needs to be reserved may be referred to as "blockout time."

Write commands on buses 190 and 195 may be arbitrated by priority, for example, based upon the order of the write commands received on the buses. Earliest received write commands may be executed first, followed by next earliest received write commands. However, some write commands may be prioritized over others according to some user defined policies.

However, when read commands are received on buses 190 or 195, there may be additional considerations. Particularly for example, if a read command is received on SPI 190, from an external device, the read commands on SPI 190 may need to be executed quickly, and there may be long periods of time needed to execute the read command, to receive all the addresses, to read the addressed registers, and to transmit all the data on the SPI 190. While the read commands for the SPI 190 is being executed, the shared read path in circuit 100 may need to be isolated. Additionally, it may be highly inefficient to switch circuit 100 between the timing of buses 190 and 195 too often. Thus, it may be necessary to perform multiple read commands on SPI 190 in a continuous block of commands.

To do so, the monitor 120 may snoop the queue 110 to look for read commands (or other command types) that need "blockout time" reserved for execution. Write commands for control registers typically do not need "blockout time" because for control purposes, write commands typically require execution to be done as soon as possible, and thus should be arbitrated in FIFO order generally as indicated above.

Specifically for example, the monitor 120 may snoop the queue 110 to see if SPI 190 received any read commands or may be beginning to receive read command (in the first few bits). The monitor 120 may then determine if a "blockout time" is needed to reserve for incoming read commands in SPI 190, and if a "blockout time" is needed, estimate the duration of the "blockout time".

In estimation of duration of the "blockout time", the monitor 120 may calculate the duration based upon the speeds of buses 190 and 195, and the number of pending read commands in SPI 190. The duration of the "blockout time" may be limited by a preset minimum and maximum duration value. Because it may be inefficient to allow the circuit 100 to switch interfaces too often, it may be desirable to blockout at least a minimum period of "blockout time" reserved for read commands from SPI 190. That is, to allow blockout when the estimated "blockout time" exceeds a minimum threshold of duration. On the other hand, may not be desirable to have too long of a "blockout time" reserved for SPI read, because doing so may degrade the control available to the AHB 195. Thus, a maximum "blockout time" may be use to limit how long circuit 100 may be reserved for read for SPI 190.

Depending on the transmission endianness of the SPI bus 190 (little or big endian), the blockout time may be larger or smaller. "Endianness" represents how bites are ordered within a data item. Generally for example, SPI transmissions may be done in little endian, where least significant bits are transmitted before most significant bits, or in big endian, where most significant bits are transmitted before least significant bits. Blockout time may be set preemptively to anticipate the worst case transmission mode of SPI bus 190, for the worst possible estimated duration of blockout time.

The controller 130, if the period of time needs to be reserved, based on the period of time determined by the monitor 120, may disable acceptance of commands from buses other than the one of the plurality of buses, may execute the selected commands for the one of the plurality of buses, and may allow more than one of the plurality of buses access to results of the selected commands.

Specifically for example, the controller 130, if detecting that monitor 120 has determined that "blockout time" is needed for read commands in SPI 190, may disable acceptance of commands from AHB 195. However, the controller 130 may complete execution of currently pending commands in the queue 110 from AHB 195. The controller 130 may then blockout the "blockout time" to execute read commands in the queue 110 from SPI 190. While the read commands of SPI 190 are executed, the resulting data of the read may be simultaneously available for AHB 195 to access, for example, via memory mapped direct access, or without use of commands on AHB 195.

Figure 2:
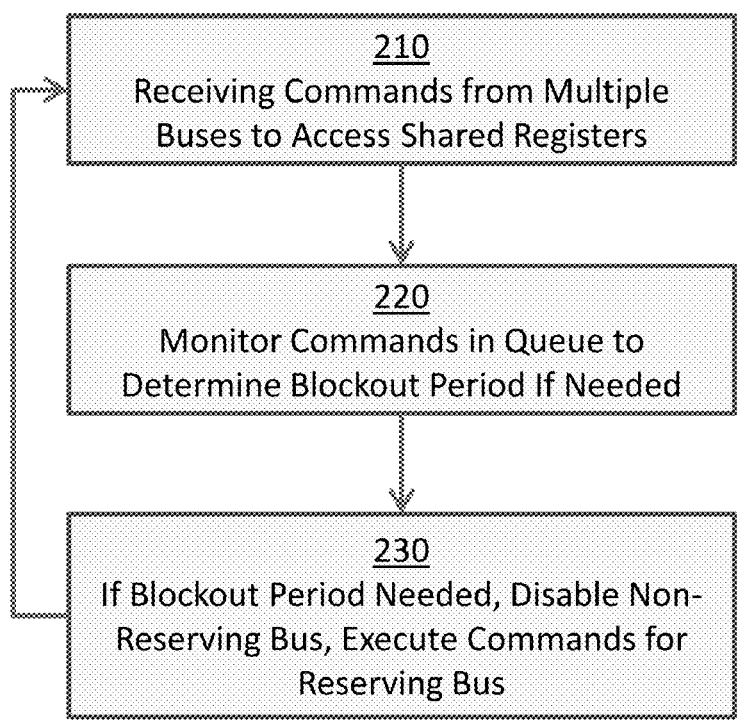
FIG. 2 illustrates a method according to an embodiment of the present disclosure.

FIG. 2 illustrates a method 200. According to an embodiment, the method 200 may include block 210, receiving and storing, by a queue, a plurality of commands from a plurality of buses to access a shared set of registers.

At block 220, monitoring, by a monitor, the plurality of commands in the queue to determine whether a period of time needs to be reserved for selected commands from one of the plurality of buses; and At block 230, if the period of time needs to be reserved, based on the period of time determined by the monitor, disabling, by a controller, acceptance of commands from buses other than the one of the plurality of buses, executing the selected commands for the one of the plurality of buses, and allowing more than one of the plurality of buses access to results of the selected commands.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A circuit, comprising:
   a queue that receives and stores a plurality of commands from a plurality of buses to access a shared set of registers;
   a monitor configured to monitor the plurality of commands in the queue to determine whether a period of time is to be reserved for selected commands from one of the plurality of buses; and
   a controller configured to, if the period of time is to be reserved, allow a completion of an execution of commands from buses other than the one of the plurality of buses, disable an acceptance of commands from the buses other than the one of the plurality of buses, execute the selected commands for the one of the plurality of buses, and allow more than the one of the plurality of buses access to results of the selected commands.

2. The circuit according to claim 1, wherein the one of the plurality of buses comprises a serial interface, and the buses other than the one of the plurality of buses comprise a parallel interface.

3. The circuit according to claim 1, wherein the one of the plurality of buses comprises a SPI interface, and the buses other than the one of the plurality of buses comprise a AHB bus.

4. The circuit according to claim 1, wherein the queue receives write commands from the plurality of buses, and the monitor arbitrates the write commands in order of receipt of the write commands.

5. The circuit according to claim 1, wherein the queue receives read commands from the plurality of buses, and the monitor estimates the period of time for the selected commands from the one of the plurality of buses.

6. The circuit according to claim 1, wherein the controller, if the period of time is to be reserved, allows the completion of the execution of the commands from the buses other than the one of the plurality of buses, before disabling the acceptance of the commands from the buses other than the one of the plurality of buses.

7. The circuit according to claim 1, wherein the monitor estimates the period of time for the selected commands from the one of the plurality of buses, based upon speeds of the plurality of buses.

8. A method, comprising:
   receiving and storing, by a queue, a plurality of commands from a plurality of buses to access a shared set of registers;
   monitoring, by a monitor, the plurality of commands in the queue to determine whether a period of time is to be reserved for selected commands from one of the plurality of buses; and
   if the period of time is to be reserved, allowing a completion of an execution of commands from buses other than the one of the plurality of buses, disabling, by a controller, an acceptance of commands from the buses other than the one of the plurality of buses, executing the selected commands for the one of the plurality of buses, and allowing more than the one of the plurality of buses access to results of the selected commands.

9. The method according to claim 8, wherein the one of the plurality of buses comprises a serial interface, and the buses other than the one of the plurality of buses comprise a parallel interface.

10. The method according to claim 8, wherein the one of the plurality of buses comprises a SPI interface, and the buses other than the one of the plurality of buses comprise a AHB bus.

11. The method according to claim 8, wherein the queue receives write commands from the plurality of buses, and the monitor arbitrates the write commands in order of receipt of the write commands.

12. The method according to claim 8, wherein the queue receives read commands from the plurality of buses, and the monitor estimates the period of time for the selected commands from the one of the plurality of buses.

13. The method according to claim 8, wherein the controller, if the period of time is to be reserved, allows the completion of the execution of the commands from the buses other than the one of the plurality of buses, before disabling the acceptance of the commands from the buses other than the one of the plurality of buses.

14. The method according to claim 8, wherein the monitor estimates the period of time is to be reserved for the selected commands from the one of the plurality of buses, based upon speeds of the plurality of buses.

15. A non-transitory computer readable medium, storing program instructions, executable by a processor to perform a method comprising:
   receiving and storing, by a queue, a plurality of commands from a plurality of buses to access a shared set of registers;
   monitoring, by a monitor, the plurality of commands in the queue to determine whether a period of time is to be reserved for selected commands from one of the plurality of buses; and
   if the period of time is to be reserved, allowing a completion of an execution of commands from buses other than the one of the plurality of buses, disabling, by a controller, an acceptance of commands from the buses other than the one of the plurality of buses, executing the selected commands for the one of the plurality of buses, and allowing more than the one of the plurality of buses access to results of the selected commands.

16. The non-transitory computer readable medium according to claim 15, wherein the one of the plurality of buses comprises a serial interface, and the buses other than the one of the plurality of buses comprise a parallel interface.

17. The non-transitory computer readable medium according to claim 15, wherein the one of the plurality of buses comprises a SPI interface, and the buses other than the one of the plurality of buses comprise a AHB bus.

18. The non-transitory computer readable medium according to claim 15, wherein the queue receives write commands from the plurality of buses, and the monitor arbitrates the write commands in order of receipt of the write commands.

19. The non-transitory computer readable medium according to claim 15, wherein the queue receives read commands from the plurality of buses, and the monitor estimates the period of time to be reserved for the selected commands from the one of the plurality of buses.

20. The non-transitory computer readable medium according to claim 15, wherein the controller, if the period of time is to be reserved, allows the completion of the execution of the commands from the buses other than the one of the plurality of buses, before disabling the acceptance of the commands from the buses other than the one of the plurality of buses.

* * * * *